Sept. 9, 1969    J. F. KIENZLE ETAL    3,465,838
PORTABLE PLATFORM SCALE

Filed June 7, 1967    4 Sheets-Sheet 1

INVENTORS
JOHN F. KIENZLE
MAURICE J. DE BO
BY
Richard C. Sundberg
ATTORNEY

Sept. 9, 1969  J. F. KIENZLE ETAL  3,465,838
PORTABLE PLATFORM SCALE

Filed June 7, 1967  4 Sheets-Sheet 3

INVENTORS
JOHN F. KIENZLE
MAURICE J. DE BO
BY Richard C. Lindberg
ATTORNEY

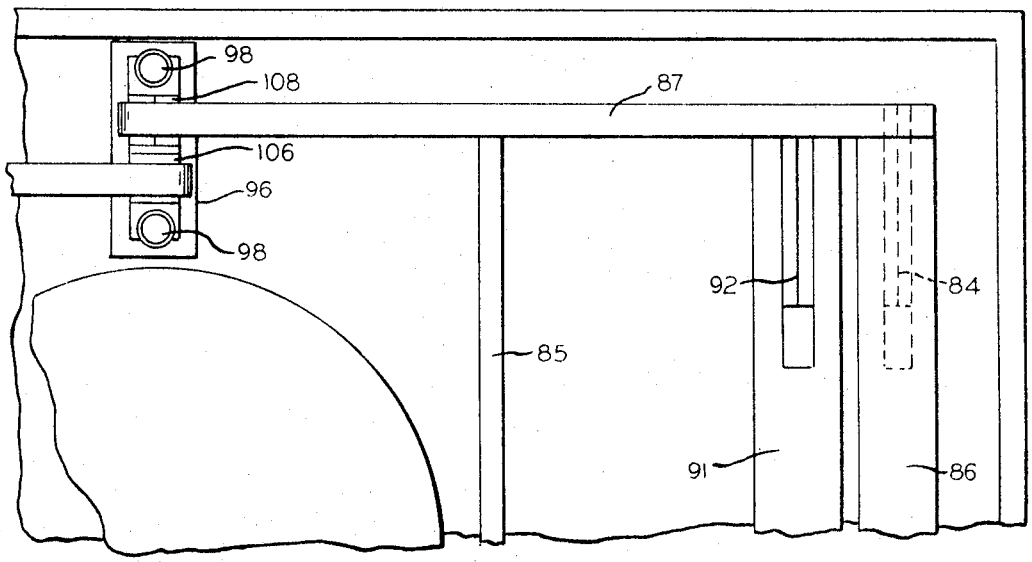
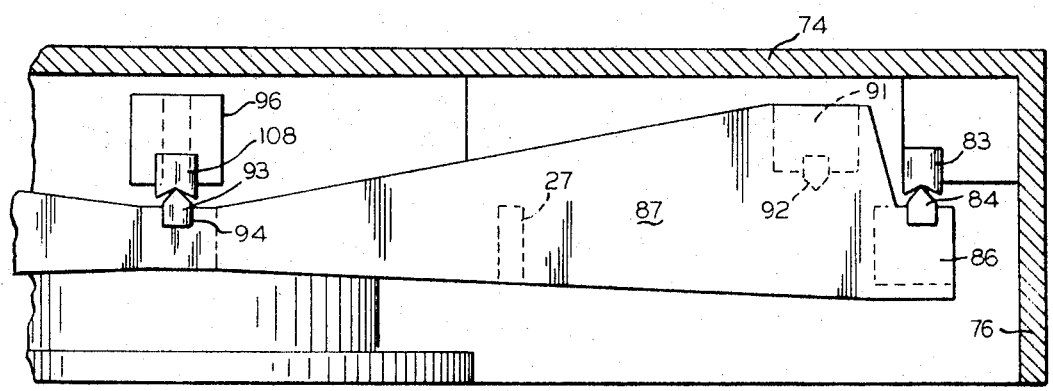
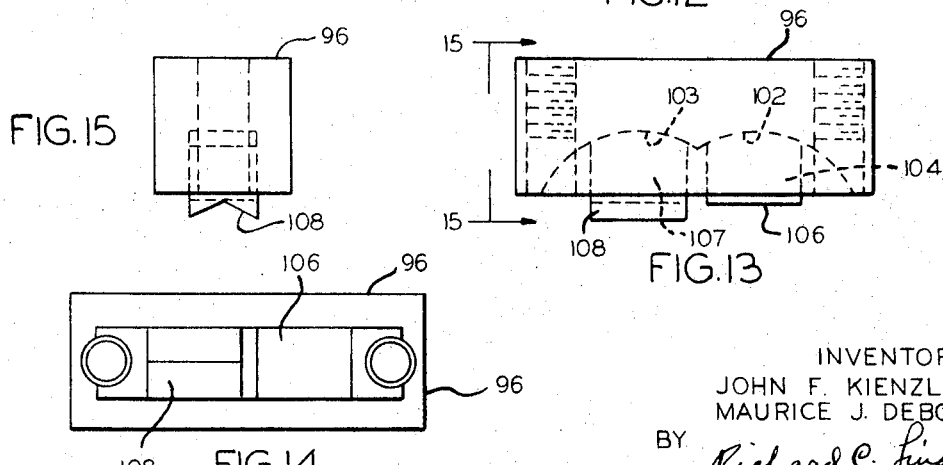
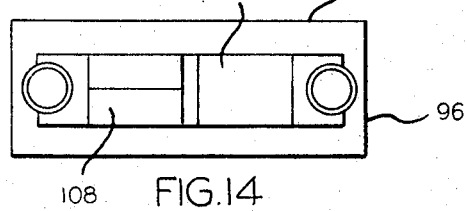

United States Patent Office
3,465,838
Patented Sept. 9, 1969

3,465,838
PORTABLE PLATFORM SCALE
John F. Kienzle, 8241 S. Lamon Ave., Oaklawn, Ill. 60459, and Maurice J. De Bo, R.R. 1, Box 198M, Belvidere, Ill. 61008
Continuation-in-part of application Ser. No. 608,553, Jan. 11, 1967. This application June 7, 1967, Ser. No. 649,783
Int. Cl. G01g 21/08
U.S. Cl. 177—256    4 Claims

ABSTRACT OF THE DISCLOSURE

A portable platform scale having load transfer arms capable of properly determining the load irrespective of the eccentricity of the load placed on the platform, and characterized by structure which is essentially symmetrical about a plane normal to the scale platform.

---

This application is a continuation-in-part of Kienzle et al. application Ser. No. 608,553, now abandoned, filed Jan. 11, 1967 for Portable Platform Scale.

As far as is known, the platform scales of the prior art have employed various devices for transmitting off-center loads on the platform into the mechanism for giving a reading of the total load. Jaenichen Pat. No. 1,548,321 and Reiser Pat. No. 2,706,626 are examples of such devices. The structures shown in these patents are characterized in that the load transmitting devices for establishing the total scale load consist of rather complicaed lever and fulcrum arrangements not readily adapting themselves to simple production techniques.

On the other hand, applicants have invented a platform scale consisting of structure which is essentially symmetrical about a plane normal to the scale platform for transmitting eccentric loads on the platform into a single load sensing device located on such axis of symmetry.

With the foregoing considerations in mind, it is a principal object of this invention to provide a portable scale capable of giving a true reading irrespective of eccentric loads on the scale platform, and provided with identical load transmitting devices which transmit the total load into a load sensing device disposed on the plane of symmetry passing through such load transmitting devices.

In the drawings:

FIG. 11 is a fragmentary bottom plan view, to enlarged scale, of a portion of the load transmitting arms of the embodiment of the scale seen in FIGS. 9 and 10;

FIG. 12 is an elevational view of FIG. 11;

FIG. 13 is an elevational view of a load receiving member for the load transmitting arms;

FIG. 14 is a plan view thereof;

FIG. 15 is an end view thereof looking in the direction of the arrows 15—15 of FIG. 13.

Figure 1:
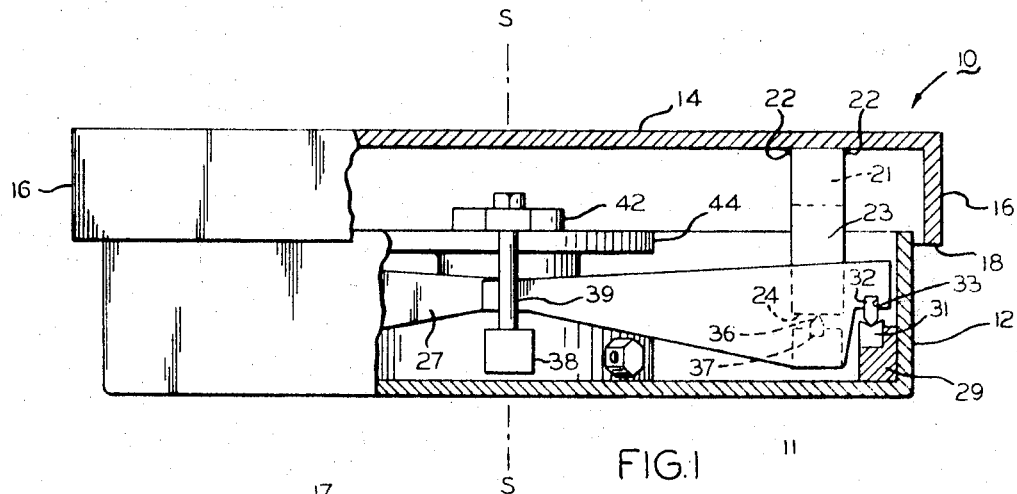
FIG. 1 is an elevational view, certain parts being broken away, of one embodiment of a portable platform scale having the improvements according to the present invention embodied therein.
Figure 2:
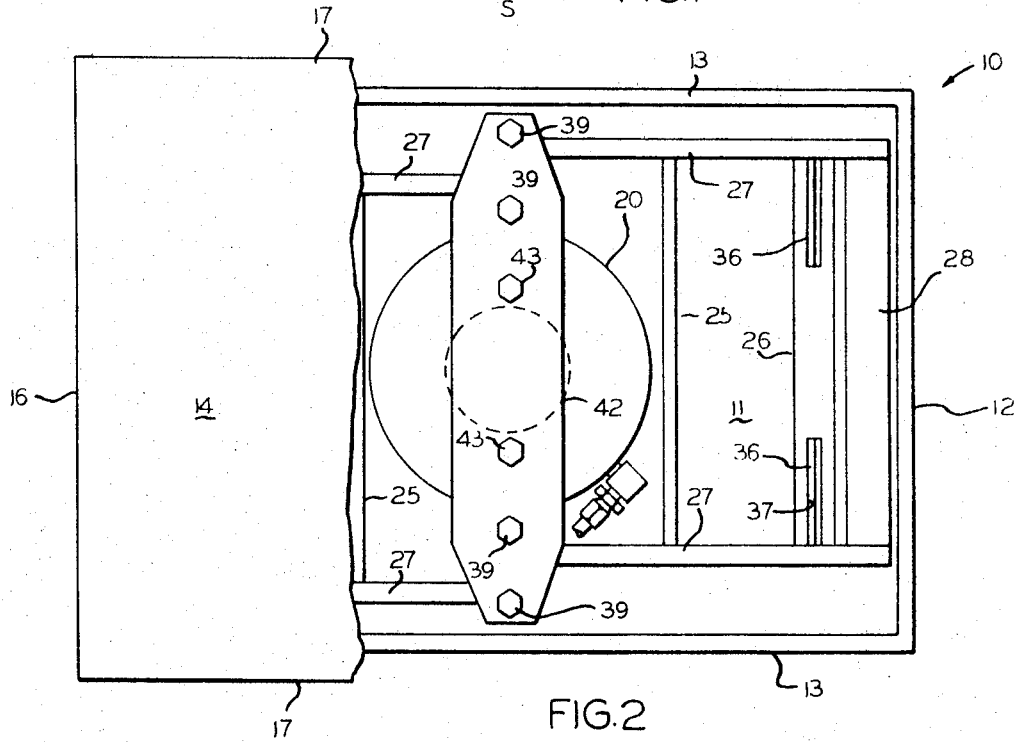
FIG. 2 is a plan view thereof, certain parts being broken away.

The portable platform according to a first embodiment of the present invention is denoted by the reference numeral 10 and consists of a base includinng a base plate 11, opposed end walls 12 and opposed side walls 13. A scale platform 14 surmounts the base described and has depending opposed end walls 16 and depending opposed side walls 17, end walls 16, and side walls 17 having their skirts 18 extending below the top edges of the end walls 12 and 13 and spaced therefrom as seen in FIG. 1.

Figure 8:
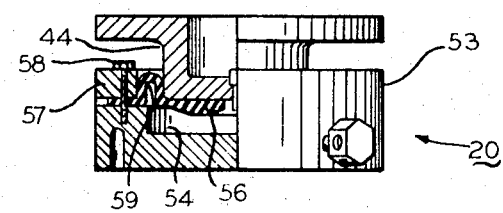
FIG. 8 is an elevation view of a load sensing cell adapted to receive the load from load receiving members such as are shown in FIGS. 5 to 7, certain parts being shown in transverse section.
Figure 3:
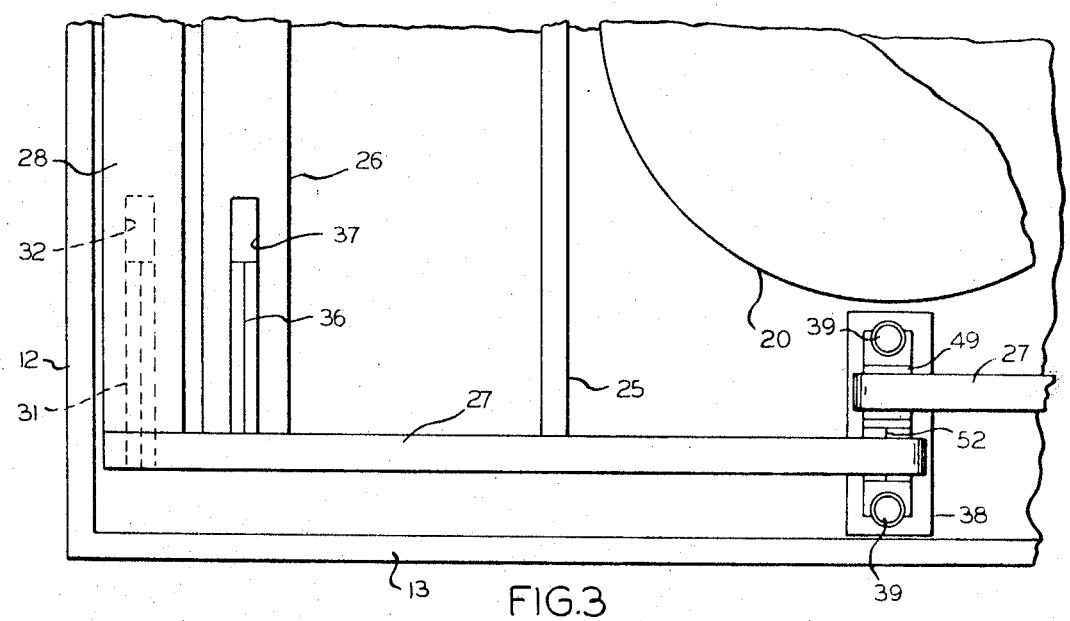
FIG. 3 is a fragmentary plan view, to enlarged scale, of a portion of the load transmitting arms of the scale seen in FIGS. 1 and 2.
Figure 4:
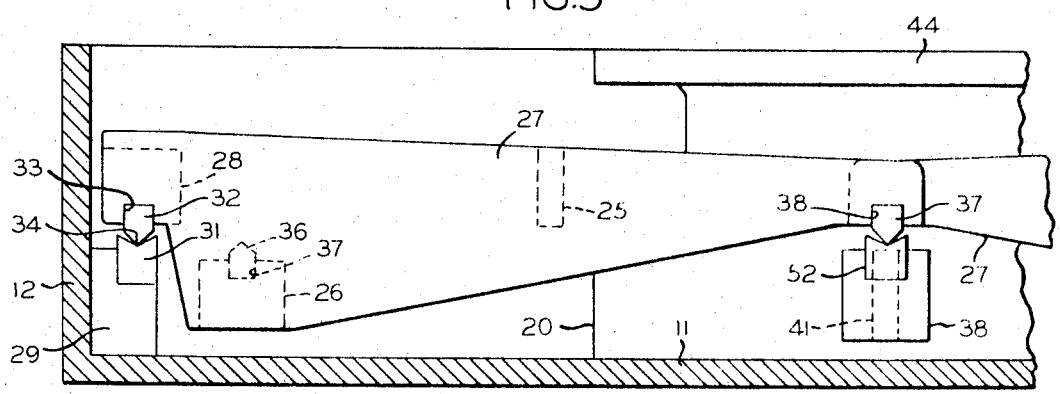
FIG. 4 is an elevational view of FIG. 3.

A load, not shown, on scale platform 14 is adapted by mechanism to be described to be transmitted into a load sensing device indicated generally by the reference numeral 20, and as seen in FIG. 8.

All of the structure for transmitting loads to load sensing device 20 is substantially symmetrical about a plane of symmetry S—S seen in FIG. 1. As seen therein, the scale platform 14 is stiffened near its ends by girder chairs 21 extending laterally thereof and welded to the underside of the scale platform 14 by weldments 22. Each end of the girder chair 21 terminates in a load transmitting post 23 having flat and smooth lower faces 24.

The load transmitting posts 23 transmit their loads to a pivot bar 26 extending between and secured by weldments, not shown, at its ends to laterally spaced levers 27 of the second class. The latter are joined at one end for pivoting as a unit to a pivot bar 28 by weldments, not shown. The levers 27 are additionally held together as a unit by a strut member 25 extending laterally therebetween and welded at its ends to the levers 27. Pivot bar 28 and levers 27 are mounted for pivoting movement on a fulcrum chair 29 supported on base plate 11 adjacent the inside of end wall 12. Chair 29 supports laterally spaced hardened and ground V-grooved blocks 31. Laterally spaced knife edge members 32 are held in milled slots 33 in the pivot bar 28, and each knife edge member 33 has a knife edge 34 resting in the V-groove of the correlative block 31.

The load on the load transmitting posts 23 impinges against laterally spaced knife edge members 36 held in laterally spaced milled slots 37 in the pivot bar 26.

The ends of the levers 27 remote from their fulcrum at V-grooved blocks 31 are each provided with a knife edge member 37 held in a milled slot 38. The scale loads transmitted by the levers 27 are transmitted in turn to hanger blocks 38 suspended by screws 39 tapped at 41 thereinto, and located at each end of a load transmitting strap 42 secured by cap screws 43 tapped into a piston 44 of the load sensing device 20.

Structure is provided at the aforementioned free ends of the lever arms 27 to accommodate any tendency of a pair of lever arms 27 to twist out of a predetermined plane by reason of a difference in the load between load transmitting posts 23. Structure is also provided for accommodating the rocking movement of the levers 27 in such a fashion as to make any movement of the hanger blocks 38 substantially only along the plane of symmetry S—S.

Figure 5:
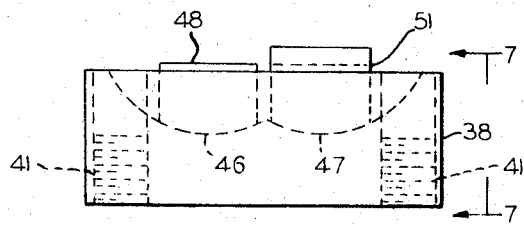
FIG. 5 is an elevational view of a load receiving member for the load transmitting arms.
Figure 7:
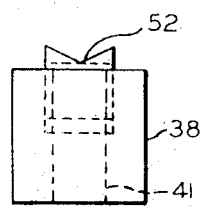
FIG. 7 is an end view thereof looking in the direction of the arrows 7—7 of FIG. 5.
Figure 6:
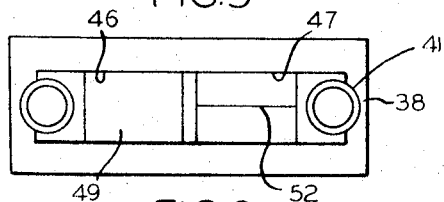
FIG. 6 is a plan view thereof.

To the former end, the hanger blocks 38 are milled with slots 46 and 47 by a circular milling tool turning on a fixed center, so that the bottom of each slot lies on a circular segment as seen in FIG. 5. Slot 46 has a block 48 inserted therein, block 48 having a flat upper surface 49. Slot 47 has a block 51 inserted therein, block 51 having a V-notch 52 in the top thereof.

If, by reason of any inequality of load on load transmitting posts 23 tending to twist a set of levers out of the predetermined plane described, which at the same time would cause twisting of the lever arms, particularly at their ends, such twisting can be accommodated by the slight rocking movement of the blocks 48 and 51 in their respective slots 46 and 47.

To the latter end as previously mentioned, the rocking of the left pair of levers 27 about their fulcrums would cause the hanger block 38 to move downward under load on an arc corresponding to the engagement of the knife edge 38 thereof with V-block 52. On the other hand, the rocking of the opposite pair of levers 27 causes the ends thereof remote from their fulcrum to move along an arc different from the arc of movement of the other pair of levers. Such difference in movement is accommodated by the knife edges of such opposite pair of levers sliding on the flat surfaces 49 of the blocks 48.

The two arcuate movements described and the loads thereon are effectively merged into a single load effective in a vertical direction only on the hanger blocks 38. It should be noted at this point that the screws 39 tapped into the hanger blocks 41 are somewhat loosely fitted into the load transmitting strap 42 so that a vertical load only is effective on the piston 44 of the load sensing device 20.

The load sensing device 20 comprises a base housing 53 having a chamber 54 therein closed by a diaphragm 56 held in position to housing 53 by an annular rim 57 secured by cap screws 58 tapped into housing 53. The diameter of piston 44 is less than the inside diameter of rim 57, so that the diaphragm 56 has an annular rib 59 therein to provide rolling action upon movement of piston 41. Chamber 54 has a pressure fitting 61 connected thereto, which in turn is connected to a suitable indicator dial indicating the total load on the scale platform 14. Such indicator may be of the type having a Bourdon tube, or any suitable other indicating means. Any convenient means may be employed for securing base housing 53 to the base plate 11.

Figure 9:
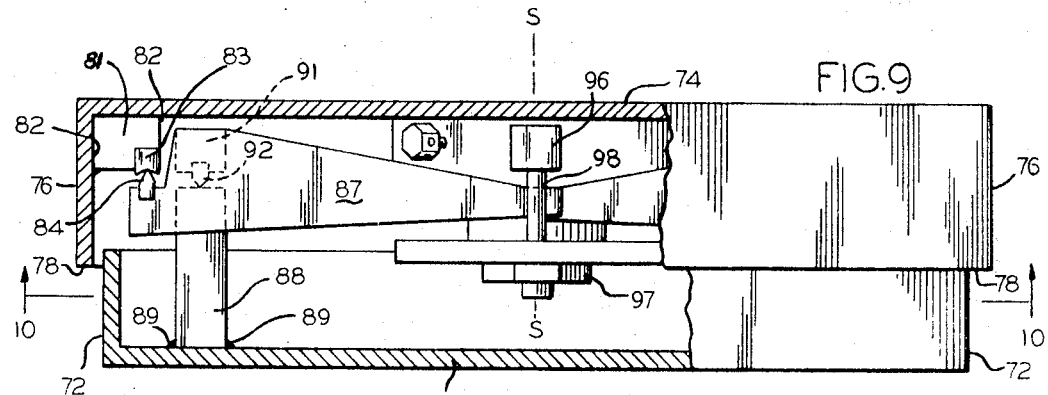
FIG. 9 is an elevational view, certain parts being broken away, of a second embodiment of a portable platform scale having the improvements according to the present invention embodied therein.
Figure 10:
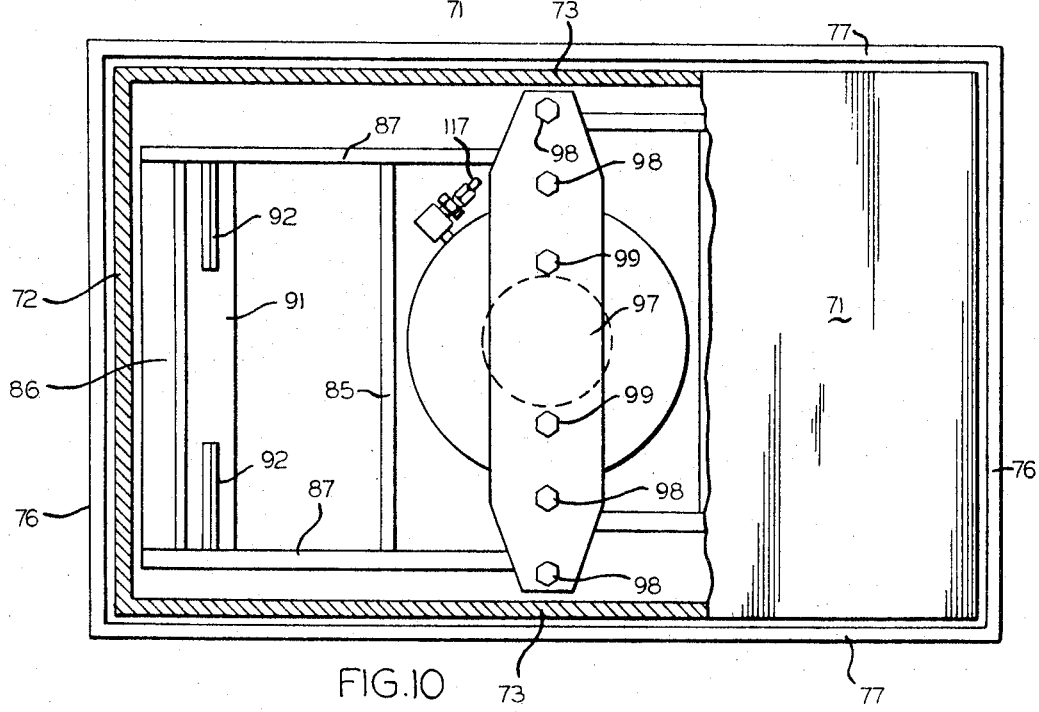
FIG. 10 is a view looking in the direction of the arrows 10—10 of FIG. 9.

The portable platform scale according to a second embodiment of the invention is seen with reference to FIGS. 9 to 16, and is denoted by the reference numeral 70. It consists of a base including a base plate 71, opposed end walls 72 and opposed side walls 73. A scale platform 74 surmounts the base described and has depending opposed end walls 76 and depending opposed side walls 77, the end walls 76, and side walls 77 having their skirts 78 extending below the top edges of the end walls 72 and 73 and spaced therefrom as seen in FIGS. 9 and 10.

Figure 16:
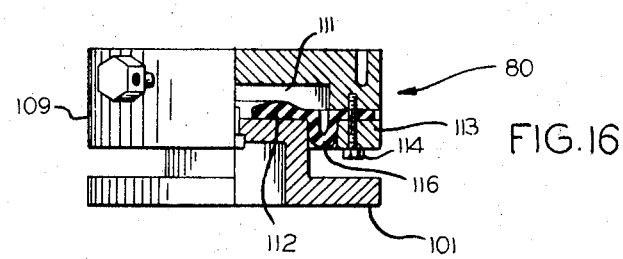
FIG. 16 is an elevation view of a load sensing cell adapted to receive the load from load receiving members such as are shown in FIGS. 13 to 15, certain parts being shown in transverse section.

A load, not shown, on scale platform 74 is adapted by mechanism to be described to be transmitted into a load sensing device indicated generally by the reference numeral 80, and as seen in FIG. 16, similar to the load device 20 seen in FIG. 8, but reversed in sense for a purpose as will appear.

As with the structure seen in FIGS. 1 to 8, all of the structure for transmitting loads to load sensing device 80 is substantially symmetrical about a plane of symmetry S—S seen in FIG. 9. The essential difference between the two embodiments of the invention is that the structure according to this second embodiment employs levers of the first class for determining the load on the scale platform, instead of levers of the second class as was the case with the first embodiment. As seen therein, the scale platform 74 is provided at its ends with load transmitting chairs 81 extending inside and laterally thereof and welded to the underside of the scale platform 74 by weldments 82. Each end of the load transmitting chairs 81 is provided with a V-block 83 engaged with cooperating knife edges 84 supported in a pivot bar 86 extending between and secured at its ends to laterally spaced levers 87 of the first class.

The load at the knife edges 84 and the levers 87 is supported on laterally spaced posts 88 welded at 89 to the bottom 71. A pivot bar 91 extends between the levers 87, and is provided with knife edges 92 resting upon the tops of the spaced posts 88. The levers 87 are additionally held together as a unit by a strut member 85 extending laterally therebetween and welded at its ends to the levers 87.

The ends of the levers 87 remote from their fulcrum at the knife edges 92 resting on the spaced posts 88 are each provided with a knife edge member 93 held in a milled slot 94 at the end of each lever 87. The scale loads transmitted by the levers 87 are transmitted in turn to hanger blocks 96. The latter are spaced from a load transmitting strap 97 by screws 98 tapped into the hanger blocks 96. Load transmitting strap 97 is secured by cap screws 99 tapped into a piston 101 of the load sensing device 80, see FIG. 16.

As with the embodiment previously described, structure is provided at the aforementioned free ends of the lever arms 87 to accommodate any tendency of a pair of such lever arms 87 to twist out of a predetermined plane by reason of a difference in the load at the knife edges 84. Structure is also provided for accommodating the rocking movement of the levers 87 in such a fashion as to make any movement of the hanger blocks 96 substantially only along the plane of symmetry S—S.

To the former end, the hanger blocks 96 are milled with slots 102 and 103 by a circular milling tool turning on a fixed center, so that the bottom of each slot lies on a circular segment as seen in FIG. 13. Slot 102 has a block 104 inserted therein, block 104 having a flat upper surface 106. Slot 103 has a block 107 inserted therein, block 107 having a V-notch 108 in the top thereof.

If, by reason of any inequality of load on load transmitting chairs 81 tending to twist a set of levers out of the predetermined plane described, which at the same time would cause twisting of the lever arms, particularly at their ends, such twisting can be accommodated by the slight rocking movement of the blocks 104 and 107 in their respective slots 102 and 103.

To the latter end as previously mentioned, the rocking of the left pair of levers 87 about their fulcrums 92 would cause the hanger block 96 to move upward under load on an arc corresponding to the engagement of the knife edge 93 thereof with V-block 108. On the other hand, the rocking of the opposite pair of levers 87 causes the ends thereof remote from their fulcrum 92 to move along an arc different from the arc of movement of the other pair of levers. Such difference in movement is accommodated by the knife edges of such opposite pair of levers sliding on the flat surfaces 106 of the blocks 104.

The two arcuate movements described and the loads thereon are effectively merged into a single load effective in an upward vertical direction only on the hanger blocks 96. It should be noted at this point that the screws 98 tapped into the hanger blocks 96 are somewhat loosely fitted into the load transmitting strap 97 so that a vertical load only is effective on the piston 101 of the load sensing device 80.

The load sensing device 80 is identical with the load sensing device of the first embodiment, but is inverted, and comprises an upper base housing 109 having a chamber 111 therein closed by a diaphragm 112 held in position to housing 109 by an annular rim 113 secured by cap screws 114 tapped into housing 109. Upper base housing 109 is secured in any convenient fashion to the underside of scale platform 74, along with the balance of the assembly forming load sensing device 80. The diameter of piston 101 is less than the inside diameter of rim 113, so that the diaphragm 112 has an annular rib 116 therein to provide rolling action upon movement of piston 101. Chamber 111 has a pressure fitting 117 connected thereto, which in turn is connected to a suitable indicator dial indicating the total load on the scale platform 74. Such indicator may be of the type having a Bourdon tube, or any suitable other indicating means.

In lieu of the pressure cells 20 and 80 shown herein there may be substituted an electrical cell of the pressure type giving a reading indicative of the total load.

We claim:
1. A platform scale comprising a base and a scale platform, a load sensing device, means for transferring the loads on said scale platform to said load sensing device, the improvements in said means characterized by the fact that eccentric loads on said scale platform are transmitted to said load sensing device by structure about a plane perpendicular to said scale platform, said means comprising paired levers extending from fulcrum points located inward from opposite ends of said base, identical load transfer means acting between said scale platform and a corresponding one of said pair of levers, means for transferring the loads at the ends of said paired levers remote from said fulcrums into said load sensing device comprising a connection to said load sensing device and secured to the same, a hanger block in turn connected to said connection substantially near each end thereof, knife edge members on each end of said levers remote from their fulcrum, and means for transmitting the loads on such knife edge members into said hanger blocks including blocks mounted for rotative movement in said hanger block according to the twisting movement in the plane of a set of paired levers, a pair of said blocks being provided with smooth surfaces for receiving the loads from the knife edges of a pair of said levers.

2. The platform scale according to claim 1 wherein the other pair of said blocks are provided with V-grooves therein for receiving the loads transmitted by the knife edge members of the other pair of levers.

3. A platform scale comprising a base and a scale platform surmounting the same, a load sensing device positioned within said base, means for transferring the loads on said scale platform to said load sensing device, the improvements in said means characterized by the fact that eccentric loads on said scale platform are transmitted to said load sensing device by structure symmetrical about a plane perpendicular to said scale platform, said means comprising paired levers of the second class extending from fulcrum points extending inward from opposite ends of said base, identical load transfer means acting between said scale platform and a corresponding one of said pair of levers, means for transferring the loads at the ends of said paired levers remote from said fulcrums into said load sensing device and secured to the same, a hanger block suspended from said load transmitting strap substantially near each end thereof, knife edge members on each end of said levers remote from their fulcrum, and means for transmitting the loads on such knife edge members into said hanger blocks including blocks mounted for rotative movement in said hanger block according to the twisting movement in the plane of a set of paired levers, a pair of said blocks being provided with smooth surfaces for receiving the loads from the knife edges of a pair of said levers.

4. The platform scale according to claim 3 wherein the other pair of said blocks are provided with V-grooves therein for receiving the loads transmitted by the knife edge members of the other pair of said levers.

References Cited

UNITED STATES PATENTS

| 2,256,318 | 9/1941 | Hadley | 308—2 |
| 2,608,448 | 8/1952 | Williams | 308—2 |

FOREIGN PATENTS

| 1,158,709 | 6/1958 | France. |
| 277,573 | 9/1927 | Great Britain. |
| 313,405 | 4/1956 | Switzerland. |

RICHARD B. WILKINSON, Primary Examiner

G. H. MILLER, Jr., Assistant Examiner

U.S. Cl. X.R.

177—208; 308—2